United States Patent
Chauhan et al.

(10) Patent No.: US 12,386,071 B2
(45) Date of Patent: Aug. 12, 2025

(54) SYSTEMS AND METHODS FOR INFANT TRACK ASSOCIATION WITH RADAR DETECTIONS FOR VELOCITY TRANSFER

(71) Applicant: FORD GLOBAL TECHNOLOGIES, LLC, Dearborn, MI (US)

(72) Inventors: Shubhendra Chauhan, Mountain View, CA (US); Xiufeng Song, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 444 days.

(21) Appl. No.: 18/064,312

(22) Filed: Dec. 12, 2022

(65) Prior Publication Data
US 2024/0192369 A1    Jun. 13, 2024

(51) Int. Cl.
  *G01S 17/66*    (2006.01)
  *G01S 13/58*    (2006.01)
  *G01S 13/86*    (2006.01)
  *G01S 17/931*   (2020.01)

(52) U.S. Cl.
  CPC ............ *G01S 17/66* (2013.01); *G01S 13/58* (2013.01); *G01S 13/865* (2013.01); *G01S 17/931* (2020.01)

(58) Field of Classification Search
  CPC ........ G01S 17/66; G01S 17/931; G01S 13/58; G01S 13/865
  USPC ...................................................... 701/519
  See application file for complete search history.

(56) References Cited

U.S. PATENT DOCUMENTS

| | | |
|---|---|---|
| 10,534,079 B2 | 1/2020 | Kim |
| 10,599,150 B2 | 3/2020 | Graham et al. |
| 11,054,518 B2 | 7/2021 | Hui et al. |
| 2015/0310628 A1* | 10/2015 | Burry ............... G06T 7/246 382/103 |
| 2020/0218913 A1* | 7/2020 | Unnikrishnan ....... G01S 13/867 |
| 2020/0301013 A1 | 9/2020 | Banerjee et al. |
| 2023/0046274 A1* | 2/2023 | Chen ............... G06V 20/56 |

OTHER PUBLICATIONS

Track-Level Fusion of Radar and Lidar Data, https://ww2.mathworks.cn/help/fusion/ug/track-level-fusion-of-radar-and-lidar-data.html, Accessed Dec. 8, 2022.
Chuan Li and Feng Luo, A Data Association Method for Vehicle Detection Based on Millimeter Wave Radar, 2020 J. Phys.: Conf. Ser. 1544 012186.

* cited by examiner

*Primary Examiner* — Tan Q Nguyen
(74) *Attorney, Agent, or Firm* — Frank A. MacKenzie; Brooks Kushman P.C.

(57) ABSTRACT

Disclosed herein are systems, methods, and computer program products for operating a sensor system. The methods comprise: receiving, by a computing device, a track for an object; classifying, by the computing device, the track as an infant track or a mature track based on a type of sensor detection used to generate the track, a total number of cycles in which the lidar detections were generated, a total number of sensor detections included in the track, an object type associated with the track, an object speed, and/or a distance between the object and the sensor system; using, by the computing device, radar data to modify a speed of the track in response to the track being classified as an infant track.

20 Claims, 14 Drawing Sheets

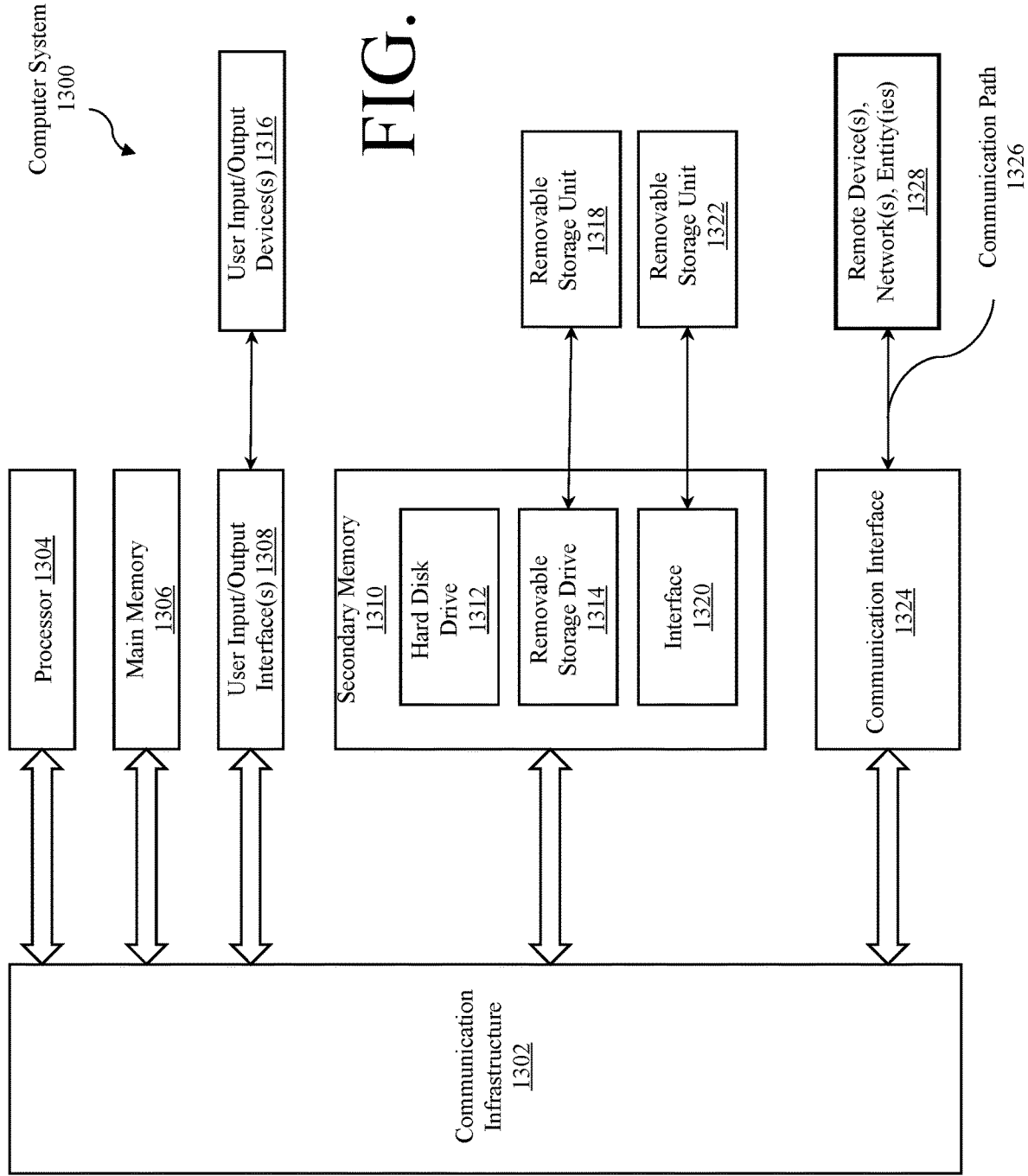

SYSTEMS AND METHODS FOR INFANT TRACK ASSOCIATION WITH RADAR DETECTIONS FOR VELOCITY TRANSFER

BACKGROUND

Description of the Related Art

Autonomous driving requires precise position and velocity of actors in the surroundings of an autonomous vehicle (AV). A precise position could be captured efficiently from a light detection and ranging (lidar) sensor. However, estimating velocity using a lidar sensor requires accumulating positions for a few time frames which results in latency. On the other hand, a radar sensor provides instantaneous doppler information but suffers from noise.

SUMMARY

The present disclosure concerns implementing systems and methods for operating a sensor system. The methods comprising performing the following operations by one or more computing devices: receiving a track for an object; classifying the track as an infant track or a mature track based on a type of sensor detection used to generate the track, a total number of cycles in which the lidar detections were generated, a total number of sensor detections included in the track, an object type associated with the track, an object speed, and/or a distance between the object and the sensor system; and using radar data to modify a speed of the track in response to the track being classified as an infant track.

The methods described above may be embodied in a system including a processor and memory containing programming instructions that, when executed, will cause the processor to implement the actions described above. Various embodiments also include a computer program product that contains such programming instructions, and a memory containing the computer program product.

BRIEF DESCRIPTION OF THE DRAWINGS

The accompanying drawings are incorporated into this document and form a part of the specification.

FIG. 13 provides an illustration of a computer system.

In the drawings, like reference numbers generally indicate identical or similar elements. Additionally, generally, the left-most digit(s) of a reference number identifies the drawing in which the reference number first appears.

DETAILED DESCRIPTION

Figure 1:
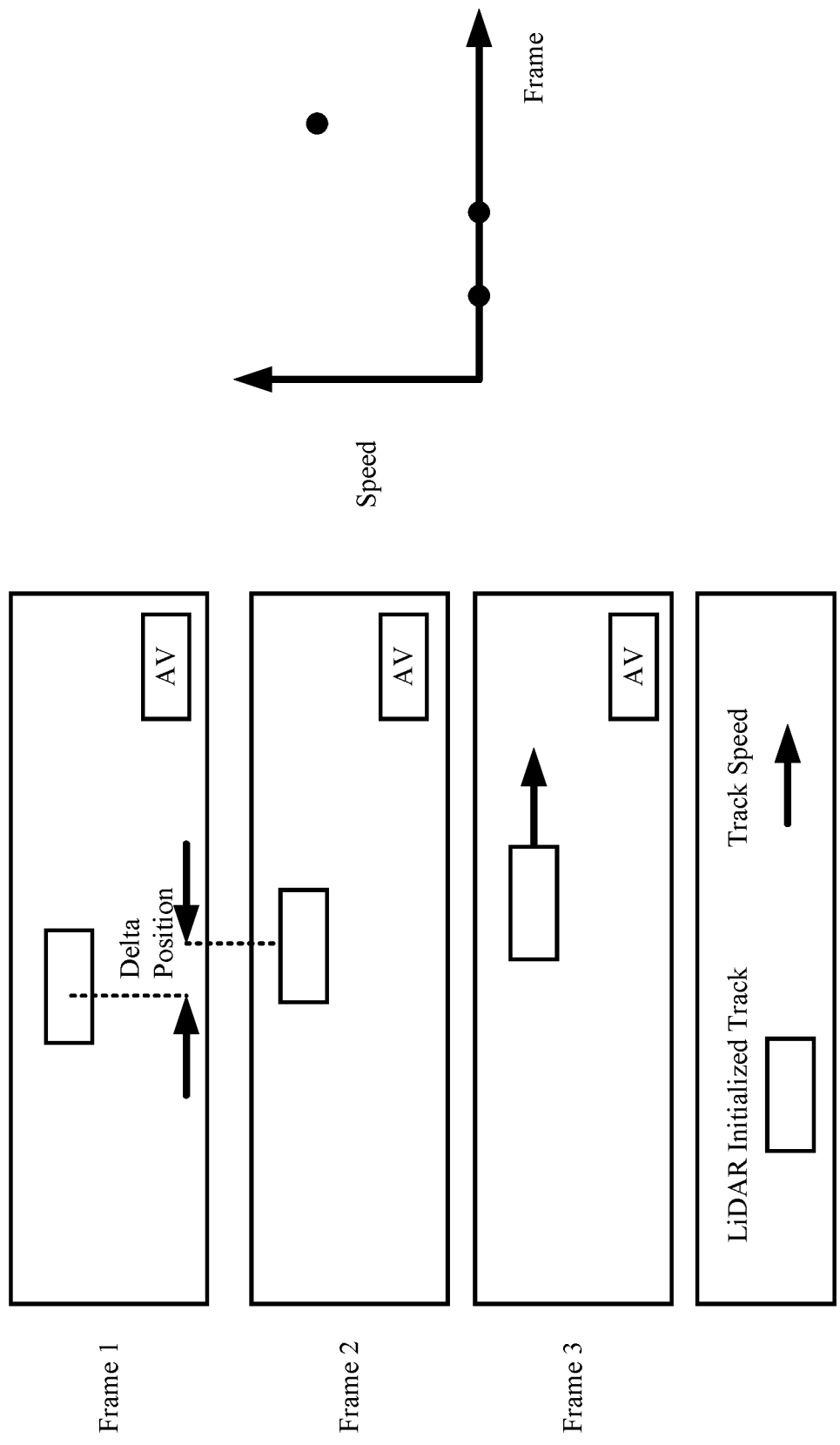
FIG. 1 provides an illustration showing latency in estimating velocity using only a lidar sensor. An actor is moving towards an AV. At frame 1, the lidar sensor captures the actor and initializes a track with zero speed. Using frame 1 and frame 2, the actor's speed can be estimated in frame 3. This results in latency which is illustrated in the right side plot.
Figure 2:
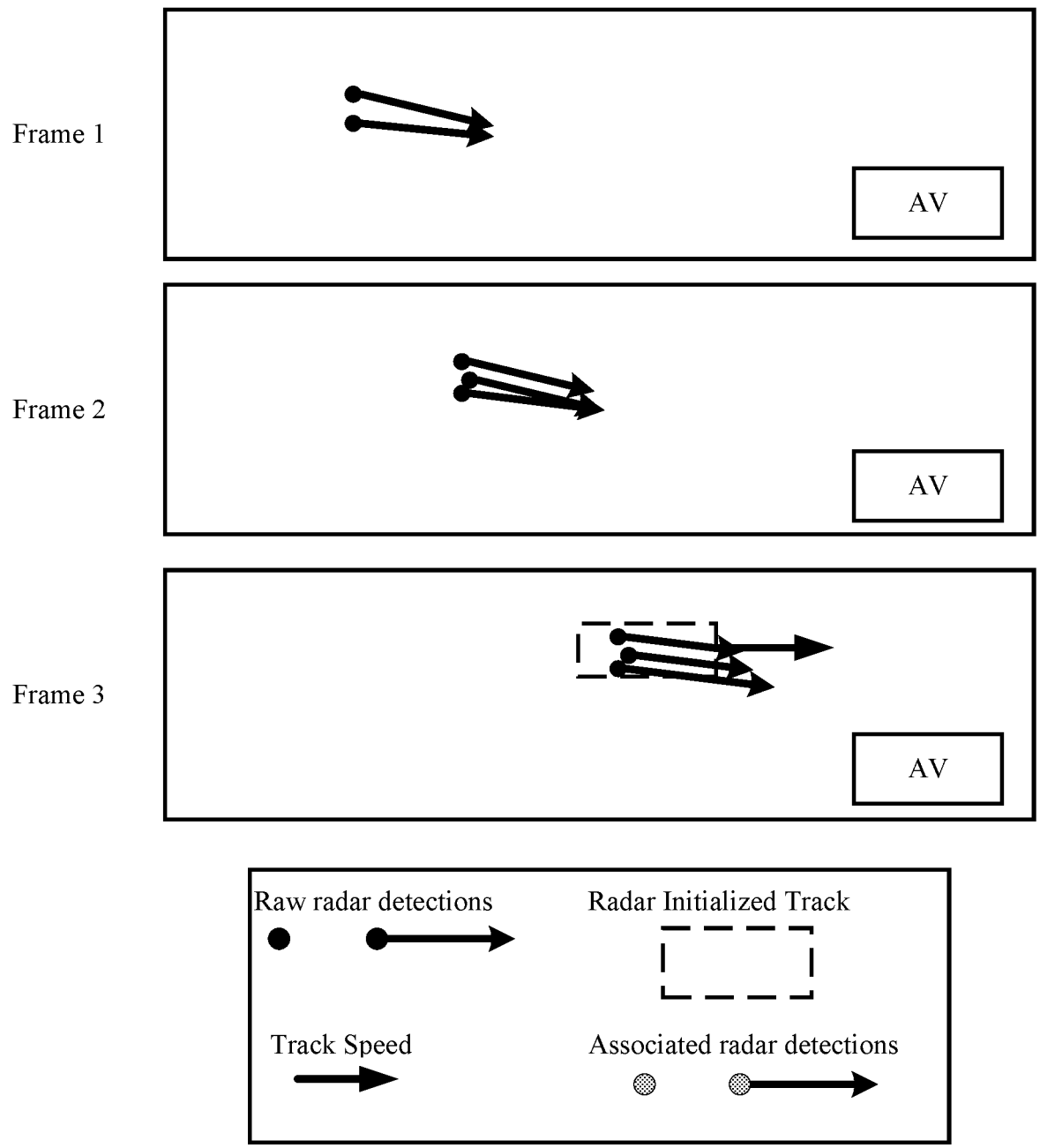
FIG. 2 provides an illustration showing latency in initializing a track corresponding to a moving actor using only a radar sensor. In frame 1 and frame 2, a track is not initialized due to relatively low confidence of a radar detection. In frame 3, a track is initialized since the confidence has increased (consistent with an increasing number of detections.
Figure 3:
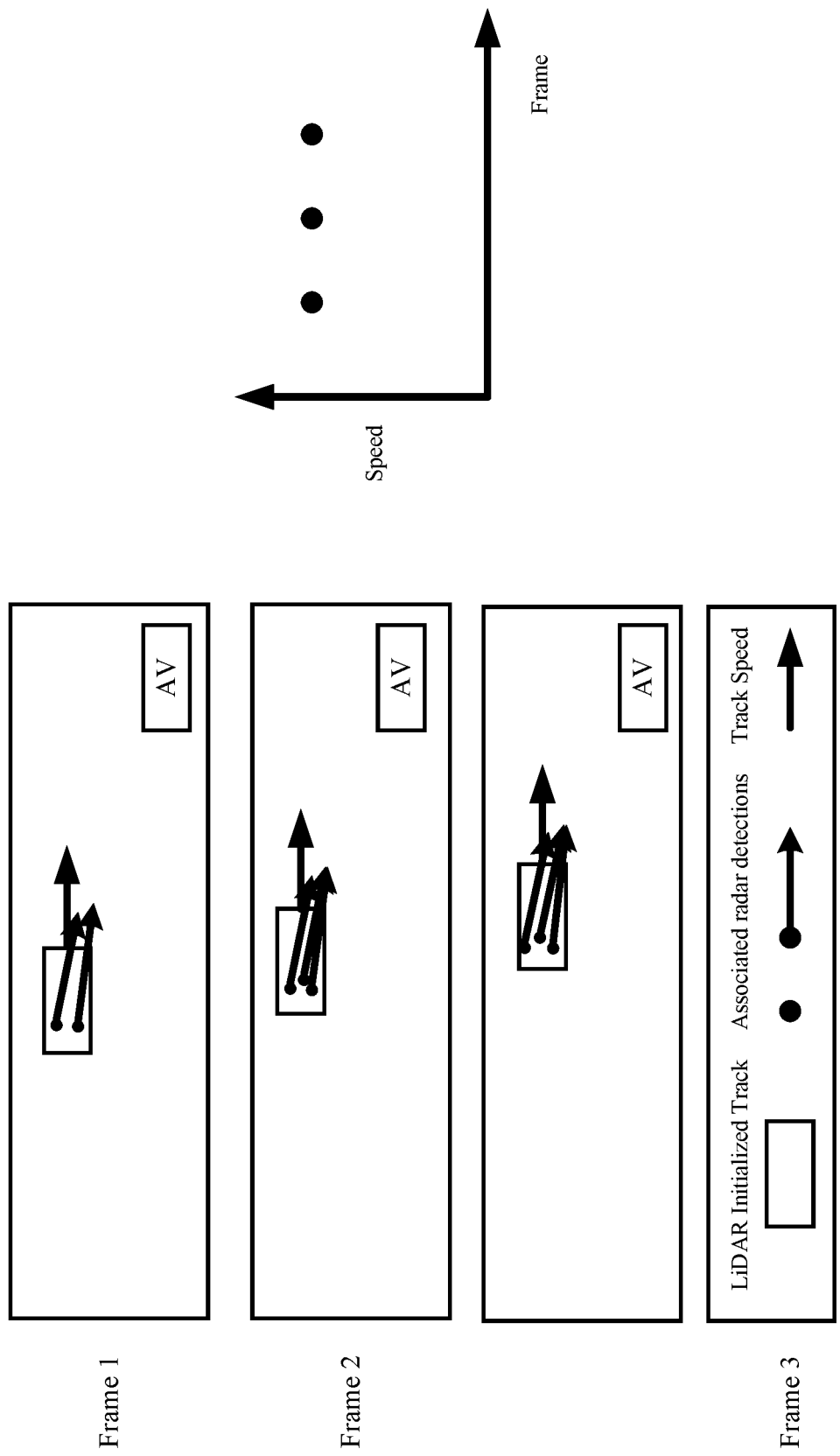
FIG. 3 provides an illustration showing instantaneous velocity information transfer from a radar sensor to lidar information. In frame 1, a lidar sensor captures a moving actor and with successful associations with radar detections the speed can be estimated instantaneously. This is illustrated in the right side plot.

Autonomous driving requires precise position and velocity of actors in the surroundings of an AV. The precise position could be captured efficiently from a lidar sensor. However, estimating velocity using a lidar sensor requires accumulating positions for a few time frames which results in latency as shown in FIG. 1. On the other hand, a radar sensor provides instantaneous doppler information but suffers from noise. Initializing a radar only track may require accumulating radar detections over a few frames to filter out noise and build confidence as shown in FIG. 2. Due to this, it is possible for lidar sensors to capture an actor prior to a radar sensor. In such scenarios, the track for the captured actor is initialized with zero velocity at the start time to and/or the start of an operation to generate the track for the actor. However, the actor may be moving and actually have a non-zero velocity. Lidar measurements need to be accumulated over time (i.e., from time to $t_0$ time $t_N$) in order to estimate the non-zero velocity value. This lidar measure accumulation causes latency in estimating the moving actor's velocity. Fusing radar doppler information with the lidar information can reduce the latency in estimating the actor's velocity.

Thus, this document describes system, apparatus, device, method and/or computer program product embodiments, and/or combinations and sub-combinations of any of the above, for infant track association with radar detections for velocity transfer. In order to achieve this objective, the present solution provides a way to determine (i) how to identify if a track is an infant track, (ii) how to associate a radar detection (e.g., range, range rate, etc.) to the infant track, and (iii) how to dealias an associated radar detection. An infant track is a track for an object that comprises lidar detections and a velocity set to zero or a value near zero (e.g., less than 1). Measurements output from radar sensors could be aliased due to under-sampling. Dealiasing may be performed to identify the true range-rate which requires additional steps.

The present solution may employ one or more modules to make the above-mentioned determinations (i)-(iii). For determination (i), the module determines whether or not an input track is an infant track by checking selected parameters such as a number of lidar detections, track life, track type and speed. For determination (ii), the module uses a cost function to make associations or compute similarities between infant tracks and radar segments (consisting of radar detections). For determination (iii), the module uses a map prior to dealiasing radar detections. Once the radar detections are associated and dealiased, they can be used to transfer velocity information from the radar detections to lidar information for infant tracks.

The methods generally involve: receiving a track for an object; classifying the track as an infant track or a mature track based on a type of sensor detection used to generate the track, a total number of cycles in which the lidar detections were generated, a total number of sensor detections included in the track, an object type associated with the track, an object speed, and/or a distance between the object and the sensor system; using radar data to modify (e.g., increase) a speed of the track in response to the track being classified as an infant track; and/or using the track with the modified speed to control autonomous operations of a vehicle.

The track may be classified as an infant track when lidar detections were used to generate the track, the total number of cycles in which the lidar detections were generated is less than a threshold number of cycles, the object type associated with the track is a vehicle type, and/or the object speed is less than a threshold speed. The track may be classified as a mature track when radar detections were used to generate the track, the total number of cycles in which the lidar detections were generated is greater than a threshold number of cycles, the object type associated with the track is a non-vehicle type, and/or the object speed is greater than a threshold speed.

The speed of the track may be modified by: identifying radar detections of the radar data that have an association with the infant track; dealiasing the radar detections which were identified; and/or updating a velocity value (e.g., zero) of the infant track to a higher velocity value (e.g., a non-zero value) based on the radar detections. The radar detections may be identified based on: an intersect over union distance between an extent of the radar detections and an extent of the lidar detections of the infant track; and/or a distance between a centroid of a radar segment and a centroid of the infant track. The dealiasing can involve: using a measured range-rate and a velocity ambiguity for the radar detections to generate hypothesis range-rate values for a plurality of different k values; identifying a hypothesis range-rate value from the hypothesis range-rate values that has (i) a range-rate orientation consistent with the orientation of a closest lane and (ii) a projected range-rate value less than or equal to a speed limit of the closest lane; and modifying the radar detections to include the identified hypothesis range-rate value.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In this document, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

The term "track" generally refers to a spatial description that identifies an object by its kinematics and/or classification attributes. A track may include, without limitation, a pose, a velocity (e.g., speed plus a direction of travel), an extent an object classification, a total number of cycles, and other information for each data point of a point cloud that is associated with the object. The pose describes a position and orientation is 3D space. The position can be defined by an x-coordinate, a y-coordinate and a z-coordinate. Techniques for generating tracks may include, without limitation, using a track filter. The track filter can include, but is not limited to, a Kalman filter.

Definitions for additional terms that are relevant to this document are included at the end of this Detailed Description.

Illustrative Sensor Systems

Figure 4:
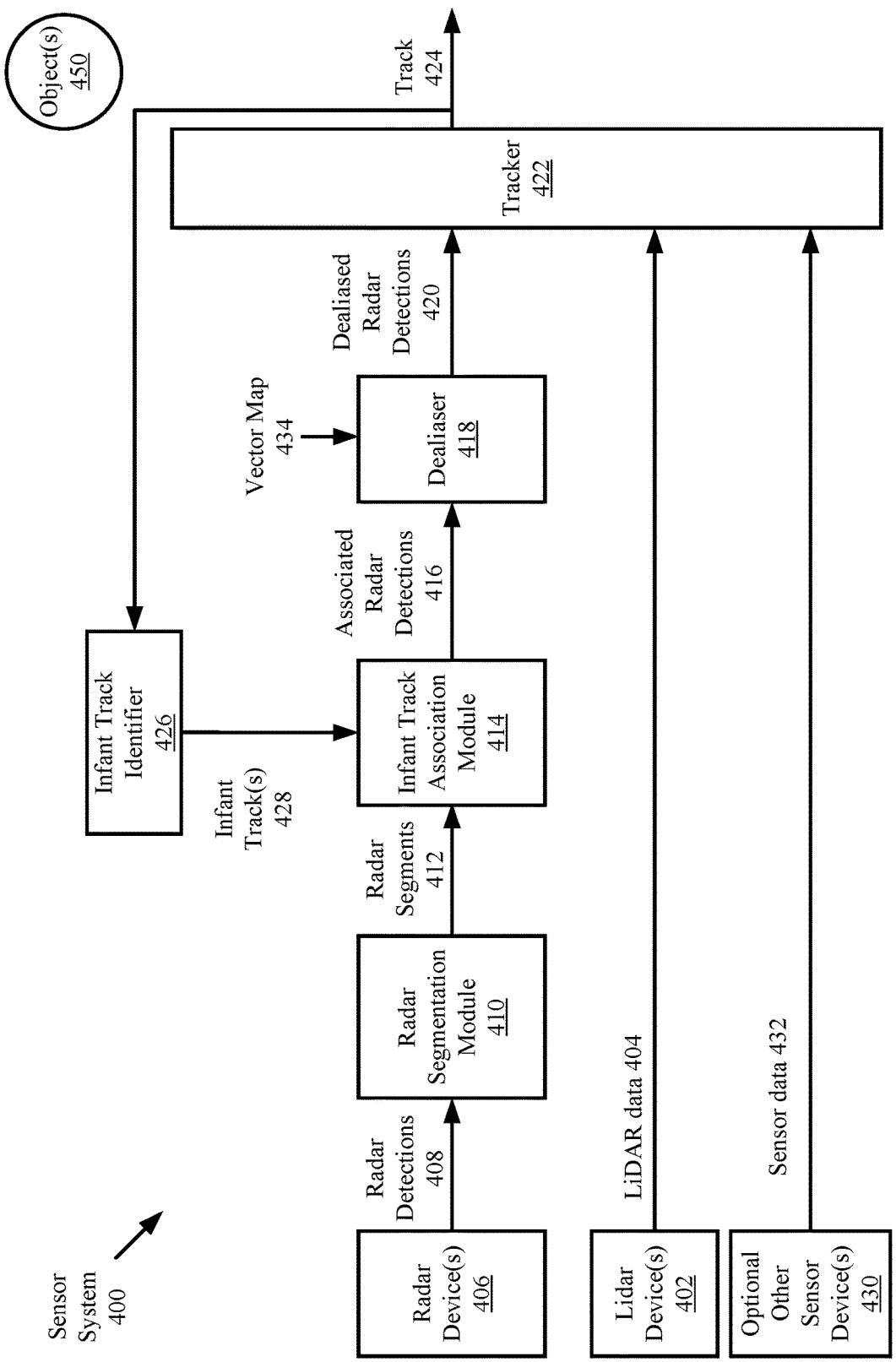
FIG. 4 provides an illustration of a sensor system.

The present solution concerns a sensor system for detecting the presence, direction, distance and speed of object, which may include moving actors, stationary objects, or both. The objects can include vehicles, ships, aircrafts, pedestrians, animals, trees and/or buildings. An illustration of an illustrative sensor system 400 is provided in FIG. 4. As shown in FIG. 4, the sensor system 400 comprises a plurality of sensor devices 402, 406, 430. The sensor devices can include lidar device(s) 402, radar device(s) 406 and optional other sensor device(s) 430 (for example, monocular camera(s), etc.). The sensor system 400 also comprises a tracker 422 configured to generate tracks using sensor data from the sensor devices 402, 406, 430. The sensor system 400 further comprises a radar segmentation module 410, an infant track identifier 426, an infant track association module 414, and a dealiaser 418. The component(s) 410, 414, 418, 422, 426 can include, but is(are) not limited to, a computing device such as that shown in FIG. 13.

During operation, each lidar device 402 emits light and receives light reflected off of the object 150 back into the lidar device. Upon receiving reflected light, photodetectors of the lidar device 402 produce results (or electrical pulses) indicating measured intensities of the light signal reflected off an object external to the lidar system. In Geiger mode applications, the photodetectors fire when a single photon at or near a target wavelength is detected thereby. The times of the photodetector firings are recorded as timestamps. The measured intensities of the reflect light and/or the timestamps are output from the lidar device 402 and provided to the tracker 422 for use in generating a track 424. Other sensor data output from sensor devices 406, 430 may additionally be used to generate the track 424. Any known or to be known technique for generating a track can be used here. The track 424 comprises a spatial description that identifies the object 150 by its kinematics and/or classification attributes. The track 424 may include, without limitation, a pose, a velocity (e.g., speed plus a direction of travel), an extent and other information for each data point of a point cloud that is associated with the object. The pose describes a position and orientation is 3D space. The position can be defined by an x-coordinate, a y-coordinate and a z-coordinate.

The track 424 is passed to an infant track identifier 426 and an external process and/or circuit (e.g., a vehicle trajectory planning process and/or circuit). The infant track identifier 426 is generally configured to analyze the track 424 and classify the track as an infant track or a mature track. The manner in which tracks are classified will become evident as the discussion progresses. The track classification can be based on, for example, the type sensor detections used to generate the track (for example, radar detections and/or lidar detections), a total number of cycles in which the sensor detections were acquired/generated/otherwise obtained, a total number of sensor detections included in the track, the type of object associated with the track (for example, vehicle, pedestrian, animal, etc.), the object's speed, and/or the object's proximity to the sensor system 400. The tracks 428 which are classified or otherwise identified as infant tracks are provided to the infant track association module 414. Tracks 428 are also referred to herein as infant tracks. The infant track association module 414 is also provided radar information.

Each radar device 406 emits a signal that is reflected off of the object 150 back towards the radar device. The reflected signal is received by the radar device 406. The received signal provides information about the object's location and speed. For example, if the object 150 is moving either toward or away from the sensor system 100, the received signal will have a slightly different frequency than the frequency of the emitted signal due to the Doppler effect. The radar device processes the received signal and generates radar detections 408. The radar detections 408 are communicated from the radar device 406 to the radar segmentation module 410.

The radar segmentation module 410 performs operations to cluster the radar detections 408 which have similar ranges, range rates, radar cross-sections (RCSs), signal-to-noise ratios (SNRs), and azimuth angles. Any known or to be known radar detection segmentation technique can be used here. Each range-rate value indicates a rate that the object 150 moves toward or away from the radar device 406. For example, in some scenarios, a positive range-rate value indicates that the object 150 is moving away from the radar device 406 at a certain velocity, while a negative range-rate value indicates that the object 150 is moving towards the radar device 406 at a certain velocity. The radar segmentation operations provide computational efficiency by reducing computational time. Each cluster of radar detections comprises a radar segment. The radar segments 412 are provided as the radar information to the infant track association module 414.

The infant track association module 414 then performs operations to associate the radar segments 412 with the infant tracks 428. The manner in which radar segments are associated with infant tracks can become evident as the discussion progresses. The associated radar detections 416 are passed to the dealiaser 418.

The dealiaser 110 performs operations using a vector map 434 to address errors in the range-rate values of the associated radar detections 416. The dealiasing operations will become evident as the discussion progresses. Upon completing the dealiasing operations, the dealiaser 110 outputs dealiased radar detections 420. The dealiased radar detections 420 are provided to the tracker 422 for use in selectively updating the velocity values of the infant tracks to higher values.

Figure 5A:
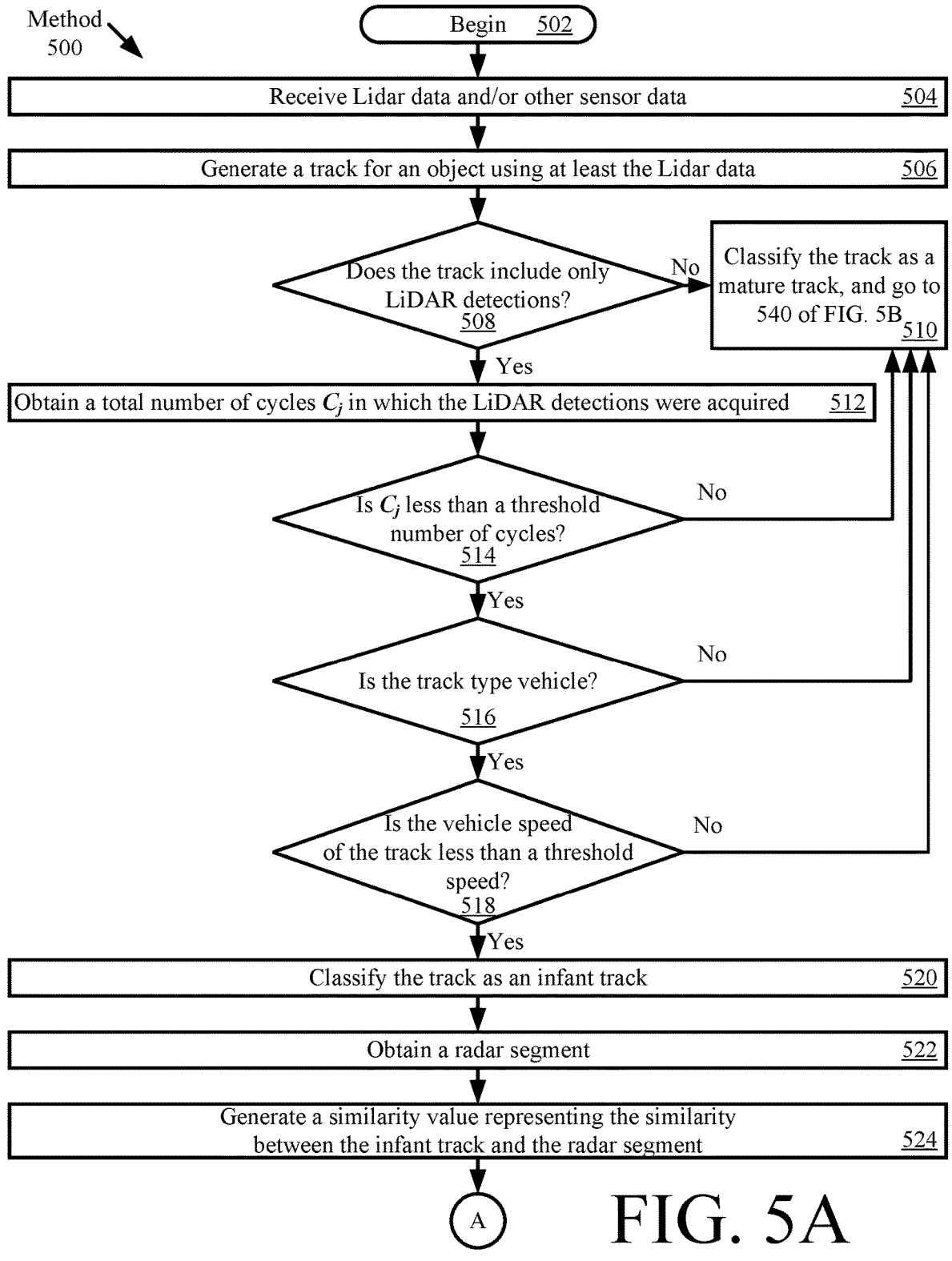
FIGS. 5A-5B (collectively referred to as "FIG. 5") provides a flow diagram of an illustrative method for operating the sensor system of FIG. 4 and/or transferring velocity to a track.

FIG. 5 provides a flow diagram of a method 500 for operating a sensor system (for example, sensor system 400 of FIG. 4) and/or transferring velocity to a track. Method 500 will be discussed below as being performed by a sensor system. The present solution is not limited to this implementation. Method 500 can be performed by one or more processors, processing devices, computing devices and/or computing systems. For example, method 500 can be performed by sensor system 400 of FIG. 4, a sensor system 1018 of FIG. 10, an on-board computing device 1022 of FIG. 10, a vehicle on-board computing device 1120 of FIG. 11, an object detection module 1204 of FIG. 12, and/or computer system 1300 of FIG. 13.

Method 500 begins with 502 and continues with 504 where at least lidar data (for example, lidar data 404 of FIG. 4) is received by the sensor system. Other sensor data (for example, dealiased radar detections 420 of FIG. 4 and/or sensor data 432 of FIG. 4) may also be received in 504. The other sensor data can include, but is not limited to, monocular camera data, radar data, and/or deep lidar data. The sensor system uses the lidar data to generate a track (for example, track 424 of FIG. 4) for an object (for example, object 450 of FIG. 4). Any known or to be known technique for generating a track using lidar data can be used here. The track can include, but is not limited to, a pose, a velocity (e.g., speed plus a direction of travel), an extent, an object classification, a total number of cycles, and other information for each data point of a point cloud that is associated with the object. The pose describes a position and orientation in 3D space. The position can be defined by an x-coordinate, a y-coordinate and a z-coordinate.

Next, the sensor system performs operations in 508-520 to classify the track as an infant track or a mature track. This classification can be based on, for example, the type sensor detections used to generate the track (for example, radar detections and/or lidar detections), a total number of cycles in which the sensor detections where acquired/generated/otherwise obtained, a total number of sensor detections included in the track, the type of object associated with the track (for example, vehicle, pedestrian, animal, etc.), the object's speed, and/or the object's proximity to the sensor system. Only some of these criteria are shown in FIG. 5 simply for ease of illustration. The present solution is not limited to the criteria considered in FIG. 5.

In 508, the sensor system analyzes the track to check or otherwise determine whether or not it includes only lidar detections. If not [508:NO], then method 500 continues with 510 where the track is classified as a mature track. In this case, method 500 ends or other operations are performed. If the track includes only lidar detections [508:YES], then method 500 continues with 512 where the sensor system obtains a total number of cycles $C_t$ in which the lidar detections are acquired. The track is classified as a mature track [514:NO] when the total number of cycles $C_j$ is equal to or greater than a threshold number of cycles $C_{thr}$ (i.e., $C_j \geq C_{thr}$). In some scenarios, the threshold number of cycles $C_{thr}$ can be set as 550 ms or 5 cycles. Otherwise [514:YES], method 500 continues to 516 (i.e., when the $C_j < C_{thr}$).

In 516, the sensor system analyzes the track to check or otherwise determine whether or not the associated object is a vehicle. If not [516:NO], the track is classified as a mature track. Otherwise, method 500 continues to 518 where the sensor system checks or otherwise determines whether the vehicle speed $V_j$ is less than a threshold speed $V_{thr}$. The track is classified as a mature track [518:NO] when the vehicle speed $V_j$ is equal to or greater than the threshold speed $V_{thr}$ (i.e., $V_j \geq V_{thr}$). In some scenarios, the threshold speed $V_{thr}$ is set to 0.1 m/s. Otherwise [518:YES], the track is classified as an infant track. The track is classified as an infant track when all of the criteria is met (for example, when the track has only lidar detections, the life of the track is smaller than a threshold (i.e., $C_j < C_{thr}$), the associated object is a vehicle, and the vehicle has a small speed (i.e., $V_j < V_{thr}$). The infant track can be static or dynamic. The nature of the motion is classified in the following operations.

When the track is classified as an infant track, method 500 continues with 522 where the sensor system obtains a radar segment (for example, a radar segment 412 of FIG. 4). The radar segment can be generated in accordance with any known or to be known technique. A similarity value is generated in 524 by the sensor system using the infant track and the radar segment. The objective of the operations in 524 is to find an optimal association between the infant track and the radar segment. An illustration is provided in FIG. 6 that is useful for finding the optimal associations.

Figure 6:
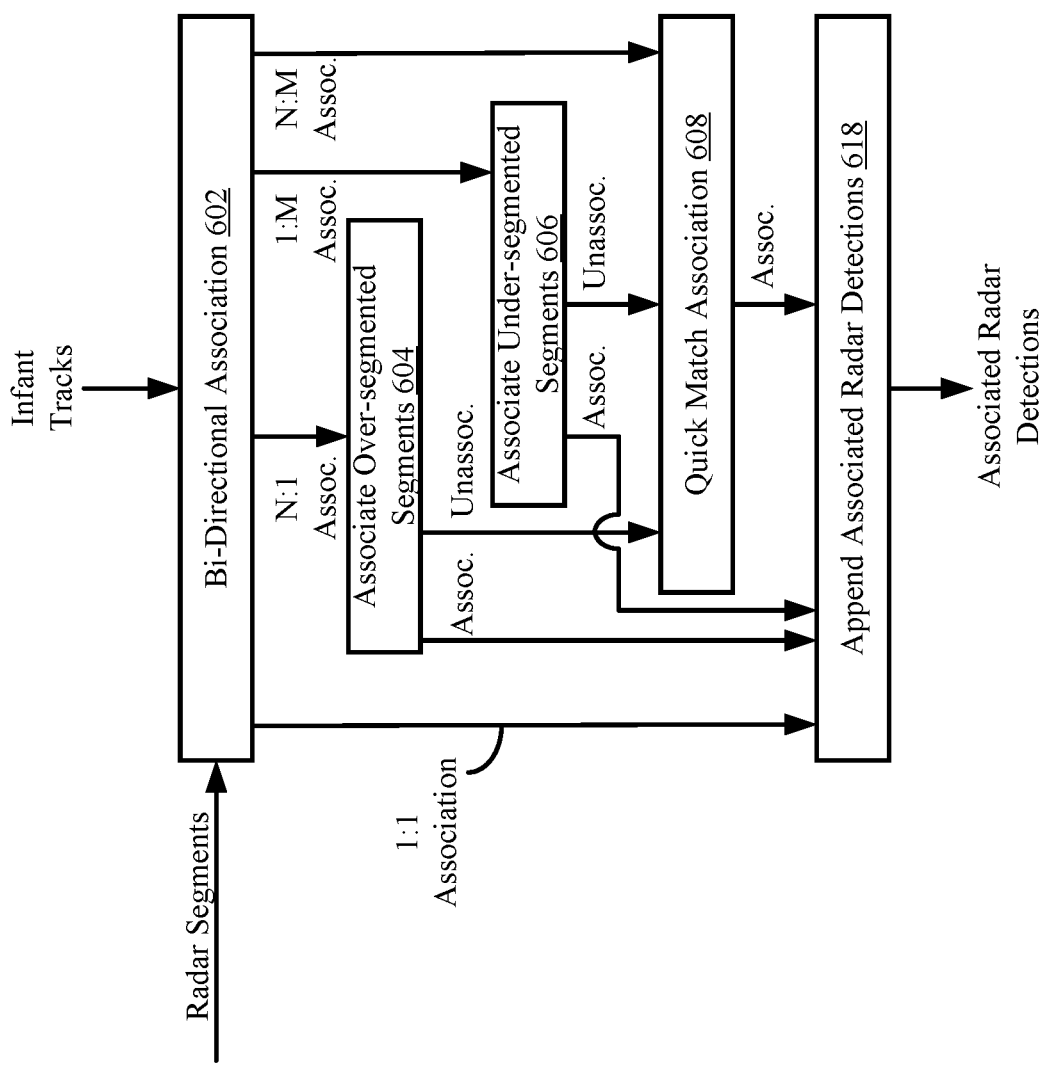
FIGS. 6-7 each provides an illustration that is useful for understanding how radar detections are classified as associated radar detections or unassociated radar detections.

As shown in FIG. 6, an optimal association may be found by performing a bidirectional association in block 602 between the infant track and the radar segment. The bidirectional association identifies the strongest associations, i.e., 1:1 associations which are considered output observations. Otherwise, operations are performed in block 604 to fix any under-segmentation (N:1 association). Operations are performed in block 606 to fix any over-segmentation (1:M association), and operations are performed in block 608 to find quick match associations for N:M association scenarios. The radar detections of this radar segment are classified as associated radar detection or unassociated radar detections in block 610 based on outputs from blocks 602-608.

Figure 7:
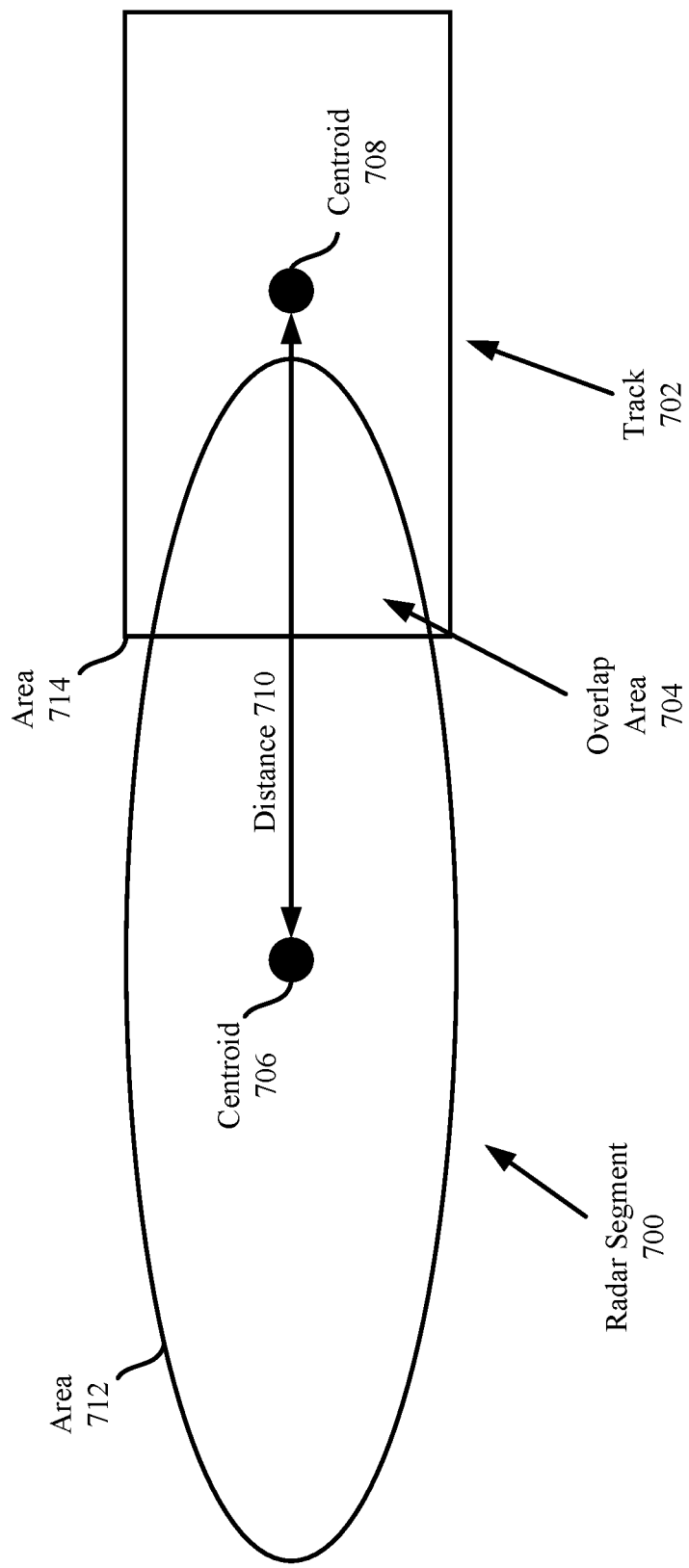

A cost function may be employed in each block 602-608 to assist with finding the associations between the infant track and the radar segment. The cost function may consider the following parameters (as shown in FIG. 7): an intersect over union (IOU) 704 distance between the radar segment and the infant track's extent; and a Mahalanobis distance 710 between a centroid 706 of the radar segment 700 and a centroid 708 of the infant track 702. The overall cost is given by the sum of the IOU distance (i.e., area 704/(area 712+area 714) and the Mahalanobis distance 710 between the centroids 706, 708. The cost for associating a radar segment i with a track j is given by the following mathematical equation (1).

$$c_{ij} = w_{iou} \cdot IOU(i, j) + d\_M(i, j) \quad (1)$$

where $c_{ij}$ represents a cost value, $w_{iou}$ represents a weight value, $IOU(i,j)$ represents an IOU distance, and $d\_M_{(i, j)}$ represents a Mahalanobis distance between a centroid of a radar segment and a centroid of a track. The cost value $c_{ij}$ may be considered a similarity value in block 524 of FIG. 5A.

Figure 5B:
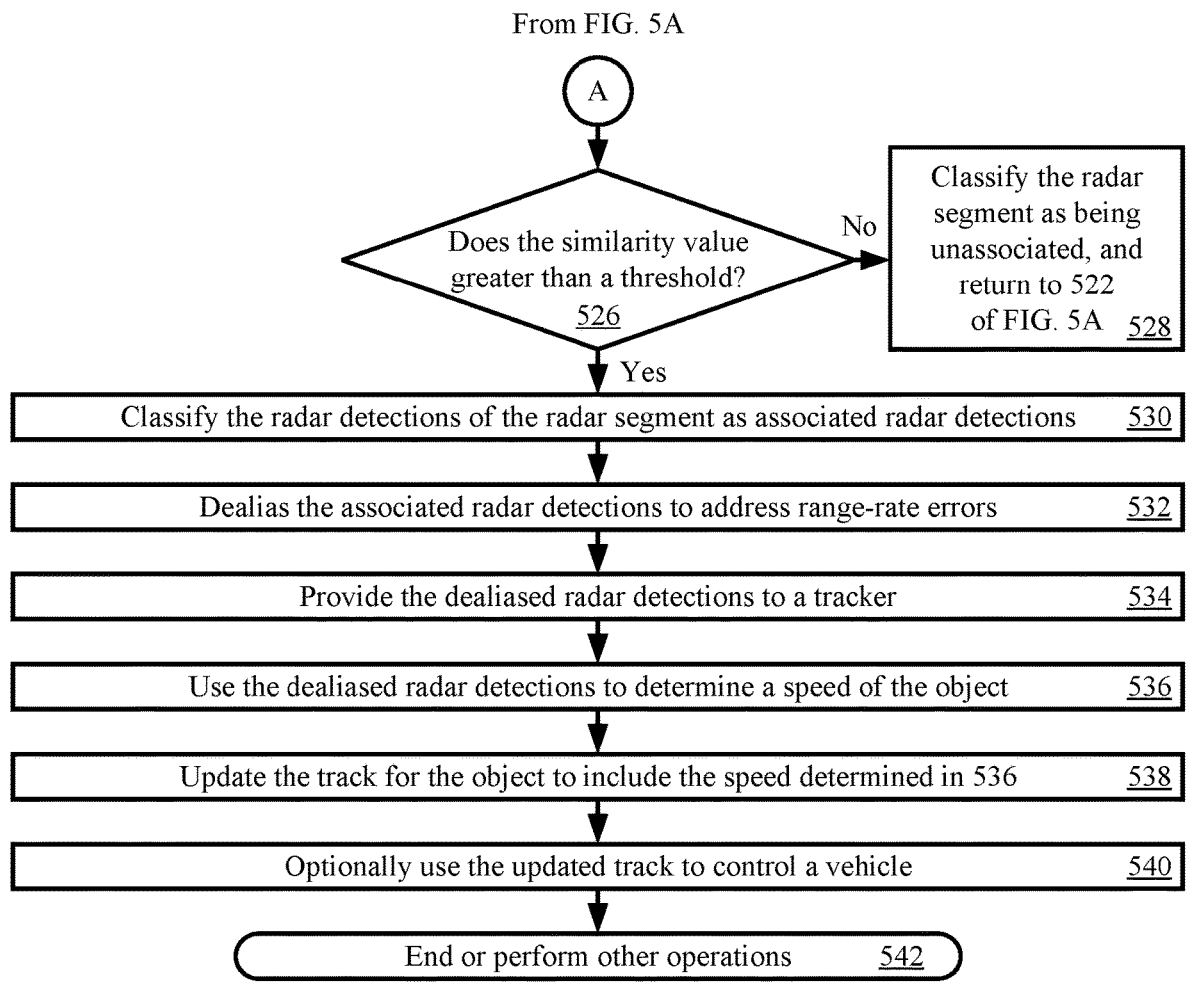

Upon completing 524, method 500 continues with 526 in FIG. 5B. As shown in FIG. 5B, 526 involves determining whether an association exits between the radar segment/detections and the infant track. One way this determination can be made is via thresholding. In this scenario, the system compares the similarity value (for example, the cost value $c_{ij}$) to a threshold similarity value $c_{thr}$. The radar segment is classified as an unassociated segment when the similarity value is equal to or less than the threshold similarity value (i.e., when $c_{ij} \leq c_{thr}$), as shown by 528. In contrast, the radar segment is classified as an associated segment when the similarity value is greater than the threshold similarity value (i.e., when $c_{ij} > c_{thr}$), as shown by 530. The present solution is not limited to the particulars of this scenario. Other techniques can be used to make a determination as to whether an association exits between the radar segment/detections and the infant track. Such other techniques methods for obtaining association pairs can include, but are not limited to, a Hungarian method, graph cut, linear programming, bidirectional association, and/or quick match.

In 532, dealiasing operations are performed by the sensor system using the radar segment which was classified as an associated radar segment. The dealiasing operations are performed to determine a true range-rate $RR_{true}$ in accordance with the following mathematical equation (2).

$$RR_{measured} = RR_{true} + k * B \quad (2)$$

where $RR_{measured}$ represents a measured range rate, k represents an unwrap factor, and B represents a velocity ambiguity. k and $RR_{true}$ are unknown. A vector map (for example, vector map 434 of FIG. 4) is used to solve mathematical equation (2) for dealiasing the range rates. The true range-rate $RR_{true}$ is inferred from measured range-rates and lane information (i.e., a direction of travel and a speed limit for a lane in which the object is located). The lane information is contained in the vector map. The manner in which the true range-rate $RR_{true}$ is inferred will be discussed in detail below in relation to FIGS. 8-9.

Upon completing 532, method 500 continues with 534 where the dealiased radar detections (for example, dealiased radar detections 420 of FIG. 4) are provided to a tracker (for example, tracker 422 of FIG. 4). The dealiased radar detections are used in 536 to determine a speed of the object. The infant track is updated in 538 to include the speed determined in 536 for the object. The updated track may optionally be used in 540 to control a vehicle. The manner in which the vehicle can be controlled will be discussed in detail below in relation to FIGS. 10-12. Subsequently, method 500 continues with 542 where method 500 ends or other operations are performed (for example, return to 502 or 522 of FIG. 5A).

Figure 8:
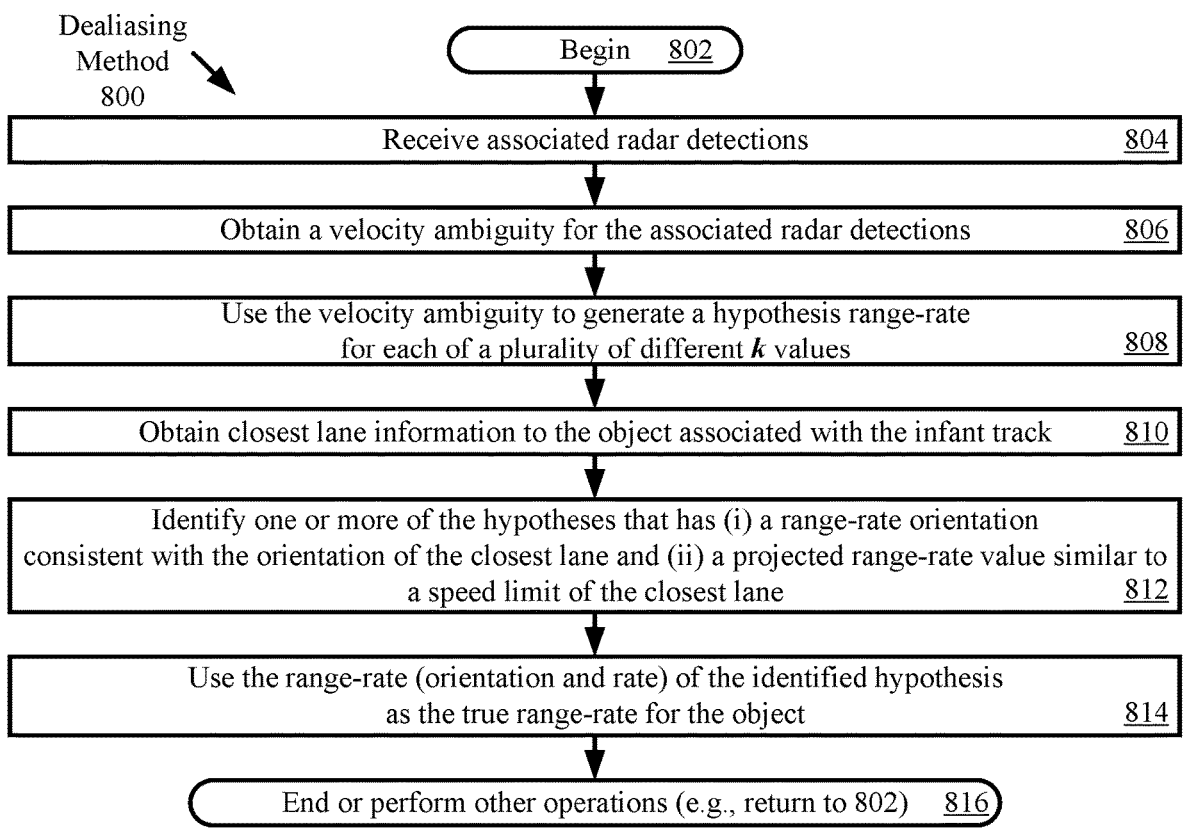
FIG. 8 provides a flow diagram of a dealiasing method for radar detections.
Figure 9:
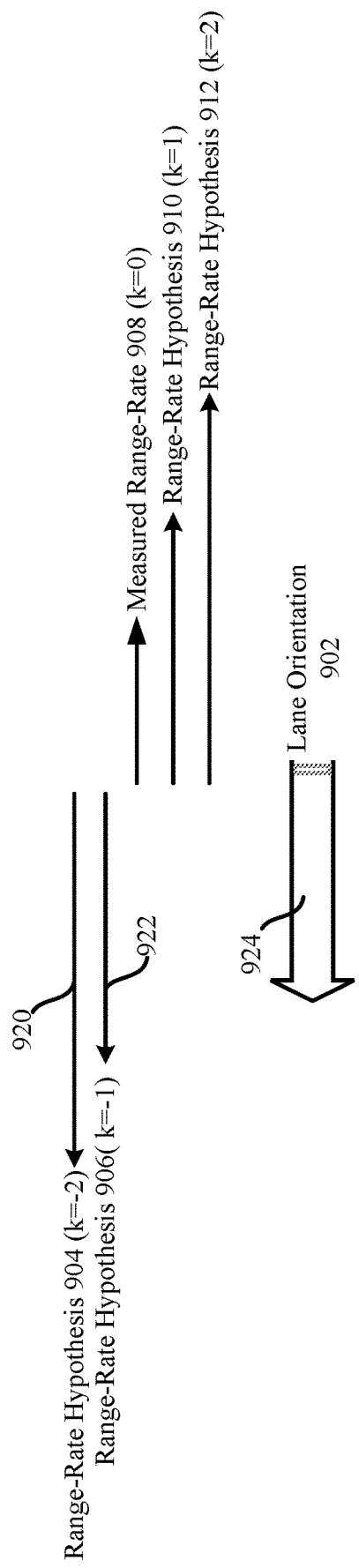
FIG. 9 provides an illustration that is useful for understanding the dealiasing of FIG. 8.

FIG. 8 provides a flow diagram of a method 800 for dealiasing radar detections. Method 800 begins with 802 and continues with 804 where radar detections of an associated segment (for example, associated radar detections 416 of FIG. 4) are received. A velocity ambiguity is obtained in 806 for the associated radar detections. The velocity ambiguity and a measured range-rate is used in 808 to generate hypothesis range-rates by solving mathematical equation (2) for each of a plurality of different k values. For example, as shown in FIG. 9, a hypothesis range-rate is computed for k values −2, −1, 0, 1, 2. Thus, there are a total of five range-rate hypothesis 904, 906, 908, 910, 912 corresponding to one measured range-rate.

In 810, information is obtained from the vector map for the closest lane to the object associated with the infant track. This information includes a lane orientation (or direction of travel) and a speed limit. At least one hypothesis is identified in 812 that has (i) a range-rate orientation consistent with the orientation of the closest lane and (ii) a projected range-rate value similar to a speed limit of the closest lane. Similarly here can be determined using the absolute difference between the projected range-rate and the posted speed limit. A projected range-rate is considered similar to the posted speed limit if the difference is smaller than a predefined threshold value. This approach accounts for the scenarios where the projected range-rate is slightly higher than the posted speed limit due to noise. For example, with reference to FIG. 9, only two 904, 906 of the five hypothesis have orientations aligned with the lane's orientation (or travel direction) 902. One of these two hypothesis 904, 906 is selected which has a speed closest to the speed limit of the lane. The speed of the hypothesis is shown by the arrows 920, 922, and the speed of the lane is shown by arrow 924. Accordingly, hypothesis 906 is selected.

In 814, the range-rate (orientation and rate) of the identified hypothesis is used as the true range-rate $RR_{true}$. For example, with reference to FIG. 9, the hypothesis range rate associated with hypothesis 906 is considered the true range-rate $RR_{true}$ for the respective radar detection. A radar segment Sn includes radar detections or data points p1, p2, p3. The range-rate for radar detection p3 is modified as shown below by the arrow.

p1: (signal strength=$s_1$, range=10, angle=11, range-rate=5.0 m/s, velocity ambiguity=30)

p2: (signal strength=$s_2$, range=10.1, angle=11.1, range-rate=5.3 m/s, velocity ambiguity=30)

p3: (signal strength=$s_3$, range=10.1, angle=11.1, range-rate=55.1 m/s→5.1 m/s, velocity ambiguity=50)

The present solution is not limited to the particulars of this example. Subsequent to completing 814, method 800 continues with 816 where it ends or other operations are performed (e.g., return to 802).

Illustrative Vehicle Based Systems

The above described sensor system 100 can be used in a plurality of applications. Such applications include, but are not limited to, vehicle based applications. The following discussion is provided to illustrate how the sensor system 100 of the present solution can be used to facilitate control of a vehicle (e.g., for collision avoidance and/or autonomous driving purposes). The vehicle can include, but is not limited to, an autonomous vehicle.

Figure 10:
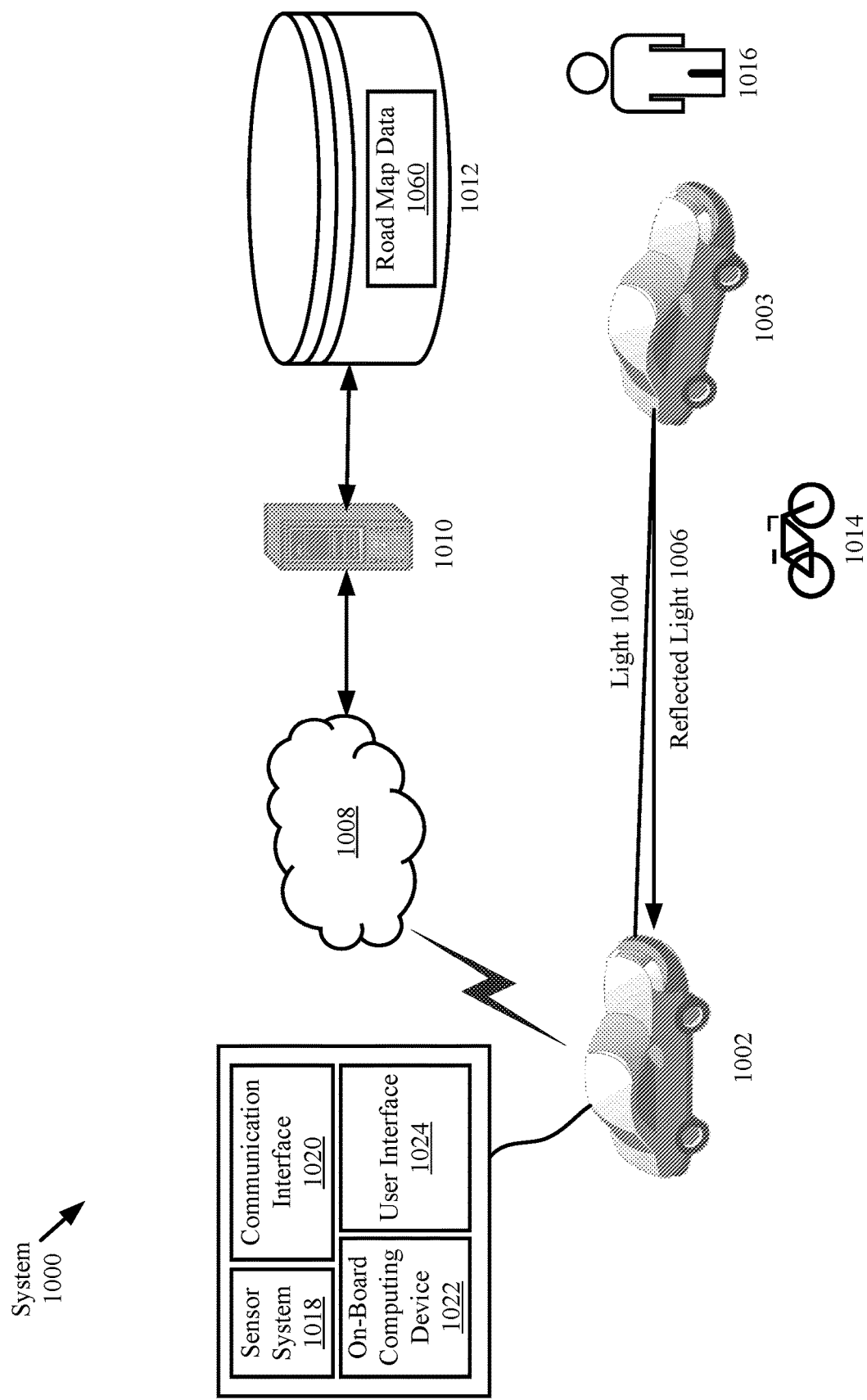
FIG. 10 provides an illustration of a system.

FIG. 10 illustrates an example system 1000, in accordance with aspects of the disclosure. System 1000 comprises a vehicle 1002 that is traveling along a road in a semi-autonomous or autonomous manner. Vehicle 1002 is also referred to in this document as AV 1002. AV 1002 can include, but is not limited to, a land vehicle (as shown in FIG. 10), an aircraft, or a watercraft. As noted above, except where specifically noted this disclosure is not necessarily limited to AV embodiments, and it may include non-autonomous vehicles in some embodiments.

AV 1002 is generally configured to detect objects in its proximity. The objects can include, but are not limited to, a vehicle 1003, cyclist 1014 (such as a rider of a bicycle, electric scooter, motorcycle, or the like) and/or a pedestrian 1016.

As illustrated in FIG. 10, the AV 1002 may include a sensor system 1018, an on-board computing device 1022, a communications interface 1020, and a user interface 1024. Autonomous vehicle system may further include certain components (as illustrated, for example, in FIG. 11) included in vehicles, which may be controlled by the on-board computing device 1022 using a variety of communication signals and/or commands, such as, for example, acceleration signals or commands, deceleration signals or commands, steering signals or commands, braking signals or commands, etc.

The sensor system 1018 may include one or more sensors that are coupled to and/or are included within the AV 1002. For example, such sensors may include, without limitation, a lidar system, a radio detection and ranging (radar) system, a laser detection and ranging (LADAR) system, a sound navigation and ranging (sonar) system, one or more cameras (for example, visible spectrum cameras, infrared cameras, etc.), temperature sensors, position sensors (for example, a global positioning system (GPS), etc.), location sensors, fuel sensors, motion sensors (for example, an inertial measurement unit (IMU), etc.), humidity sensors, occupancy sensors, or the like. The sensor data can include information that describes the location of objects within the surrounding environment of the AV 1002, information about the environment itself, information about the motion of the AV 1002, information about a route of the vehicle, or the like. As AV 1002 travels over a surface, at least some of the sensors may collect data pertaining to the surface.

The AV 1002 may also communicate sensor data collected by the sensor system to a remote computing device 1010 (for example, a cloud processing system) over communications network 1008. Remote computing device 1010 may be configured with one or more servers to perform one or more processes of the technology described in this document. Remote computing device 1010 may also be configured to communicate data/instructions to/from AV 1002 over network 1008, to/from server(s) and/or datastore(s) 1012. Datastore(s) 1012 may include, but are not limited to, database(s).

Network 1008 may include one or more wired or wireless networks. For example, the network 1008 may include a cellular network (for example, a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (for example, the Public Switched Telephone Network (PSTN)), a private network, an ad hoc network, an intranet, the Internet, a fiber optic-based network, a cloud computing network, and/or the like, and/or a combination of these or other types of networks.

AV 1002 may retrieve, receive, display, and edit information generated from a local application or delivered via network 1008 from datastore 1012. Datastore 1012 may be configured to store and supply raw data, indexed data, structured data, road map data 1060, program instructions or other configurations as is known.

The communications interface 1020 may be configured to allow communication between AV 1002 and external systems, such as, for example, external devices, sensors, other vehicles, servers, data stores, databases, etc. The communications interface 1020 may utilize any now or hereafter known protocols, protection schemes, encodings, formats, packaging, etc. such as, without limitation, Wi-Fi, an infrared link, Bluetooth, etc. The user interface system 1024 may be part of peripheral devices implemented within the AV 1002 including, for example, a keyboard, a touch screen display device, a microphone, and a speaker, etc. The vehicle also may receive state information, descriptive information or other information about devices or objects in its environment via the communication interface 1020 over communication links such as those known as vehicle-to-vehicle, vehicle-to-object or other V2X communication links. The term "V2X" refers to a communication between a vehicle and any object that the vehicle may encounter or affect in its environment.

Figure 11:
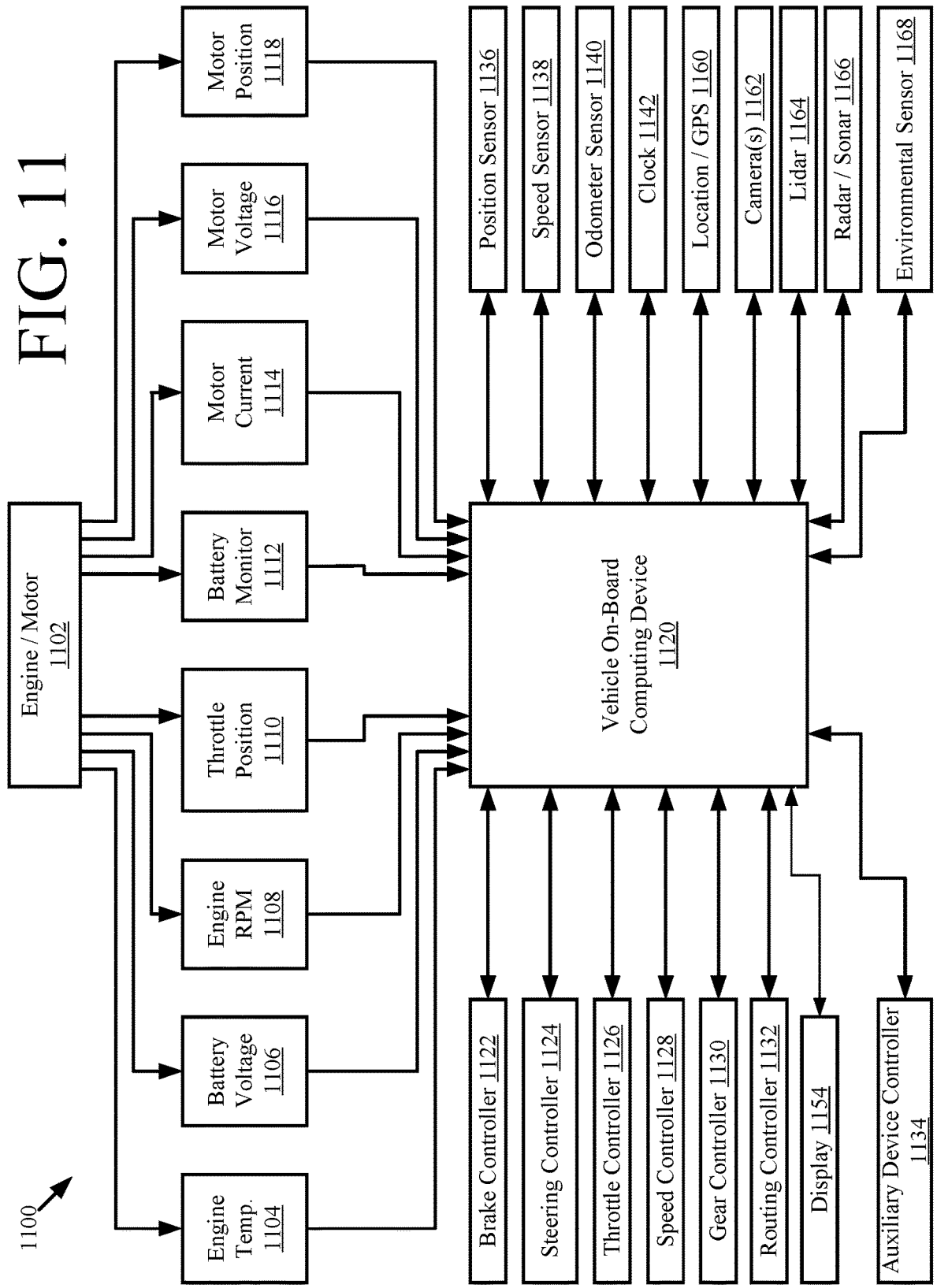
FIG. 11 provides a more detailed illustration of an autonomous vehicle.

FIG. 11 illustrates an example system architecture 1100 for a vehicle, in accordance with aspects of the disclosure. Vehicles 1002 and/or 1003 of FIG. 10 can have the same or similar system architecture as that shown in FIG. 11. Thus, the following discussion of system architecture 1100 is sufficient for understanding vehicle(s) 1002, 1003 of FIG. 10. However, other types of vehicles are considered within the scope of the technology described in this document and may contain more or less elements as described in association with FIG. 11. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 11, system architecture 1100 for a vehicle includes an engine or motor 1102 and various sensors 1104-1118 for measuring various parameters of the vehicle. In gas-powered or hybrid vehicles having a fuel-powered engine, the sensors may include, for example, an engine temperature sensor 1104, a battery voltage sensor 1106, an engine revolutions per minute (RPM) sensor 1108, and a throttle position sensor 1110. If the vehicle is an electric or hybrid vehicle, then the vehicle may have an electric motor, and accordingly includes sensors such as a battery monitoring system 1112 (to measure current, voltage and/or temperature of the battery), motor current 1114 and voltage 1116 sensors, and motor position sensors 1118 such as resolvers and encoders.

Operational parameter sensors that are common to both types of vehicles include, for example: a position sensor 1136 such as an accelerometer, gyroscope and/or inertial measurement unit; a speed sensor 1138; and an odometer sensor 1140. The vehicle also may have a clock 1142 that the system uses to determine vehicle time during operation. The clock 1142 may be encoded into the vehicle on-board computing device, it may be a separate device, or multiple clocks may be available.

The vehicle also may include various sensors that operate to gather information about the environment in which the vehicle is traveling. These sensors may include, for example: a location sensor 1160 (such as a Global Positioning System (GPS) device); object detection sensors such as one or more cameras 1162; a lidar system 1164; and/or a radar and/or a sonar system 1166. The sensors also may include environmental sensors 1168 such as a precipitation sensor and/or ambient temperature sensor. The object detection sensors may enable the vehicle to detect objects that are within a given distance range of the vehicle in any direction, while the environmental sensors collect data about environmental conditions within the vehicle's area of travel.

During operations, information is communicated from the sensors to a vehicle on-board computing device 1120. The vehicle on-board computing device 1120 may be implemented using the computer system of FIG. 13. The vehicle on-board computing device 1120 analyzes the data captured by the sensors and optionally controls operations of the vehicle based on results of the analysis. For example, the vehicle on-board computing device 920 may control: braking via a brake controller 1122; direction via a steering controller 1124; speed and acceleration via a throttle controller 1126 (in a gas-powered vehicle) or a motor speed controller 1128 (such as a current level controller in an electric vehicle); a differential gear controller 1130 (in vehicles with transmissions); and/or other controllers. Auxiliary device controller 1134 may be configured to control one or more auxiliary devices, such as testing systems, auxiliary sensors, mobile devices transported by the vehicle, etc.

Geographic location information may be communicated from the location sensor 1160 to the vehicle on-board computing device 1120, which may then access a map of the environment that corresponds to the location information to determine known fixed features of the environment such as streets, buildings, stop signs and/or stop/go signals. Captured images from the cameras 1162 and/or object detection information captured from sensors such as lidar system 1164 is communicated from those sensors) to the vehicle on-board computing device 1120. The object detection information and/or captured images are processed by the vehicle on-board computing device 1120 to detect objects in proximity to the vehicle. Any known or to be known technique for making an object detection based on sensor data and/or captured images can be used in the embodiments disclosed in this document.

Lidar information is communicated from lidar system 1164 to the vehicle on-board computing device 1120. Additionally, captured images are communicated from the camera(s) 1162 to the vehicle on-board computing device 1120. The lidar information and/or captured images are processed by the vehicle on-board computing device 1120 to detect objects in proximity to the vehicle. The manner in which the object detections are made by the vehicle on-board computing device 1120 includes such capabilities detailed in this disclosure.

In addition, the system architecture 1100 may include an onboard display device 1154 that may generate and output an interface on which sensor data, vehicle status information, or outputs generated by the processes described in this document are displayed to an occupant of the vehicle. The display device may include, or a separate device may be, an audio speaker that presents such information in audio format.

The vehicle on-board computing device 1120 may include and/or may be in communication with a routing controller 1132 that generates a navigation route from a start position to a destination position for an autonomous vehicle. The routing controller 1132 may access a map data store to identify possible routes and road segments that a vehicle can travel on to get from the start position to the destination position. The routing controller 1132 may score the possible routes and identify a preferred route to reach the destination. For example, the routing controller 1132 may generate a navigation route that minimizes Euclidean distance traveled or other cost function during the route, and may further access the traffic information and/or estimates that can affect an amount of time it will take to travel on a particular route. Depending on implementation, the routing controller 1132 may generate one or more routes using various routing methods, such as Dijkstra's algorithm, Bellman-Ford algorithm, or other algorithms. The routing controller 1132 may also use the traffic information to generate a navigation route that reflects expected conditions of the route (for example, current day of the week or current time of day, etc.), such that a route generated for travel during rush-hour may differ from a route generated for travel late at night. The routing controller 1132 may also generate more than one navigation route to a destination and send more than one of these navigation routes to a user for selection by the user from among various possible routes.

In various embodiments, the vehicle on-board computing device 1120 may determine perception information of the surrounding environment of the AV. Based on the sensor data provided by one or more sensors and location information that is obtained, the vehicle on-board computing device 1120 may determine perception information of the surrounding environment of the AV. The perception information may represent what an ordinary driver would perceive in the surrounding environment of a vehicle. The perception data may include information relating to one or more objects in the environment of the AV. For example, the vehicle on-board computing device 1120 may process sensor data (for example, lidar or radar data, camera images, etc.) in order to identify objects and/or features in the environment of AV. The objects may include traffic signals, roadway boundaries, other vehicles, pedestrians, and/or obstacles, etc. The vehicle on-board computing device 1120 may use any now or hereafter known object recognition algorithms, video tracking algorithms, and computer vision algorithms (for example, track objects frame-to-frame iteratively over a number of time periods) to determine the perception.

In some embodiments, the vehicle on-board computing device 1120 may also determine, for one or more identified objects in the environment, the current state of the object. The state information may include, without limitation, for each object: current location; current speed and/or acceleration, current heading; current pose; current shape, size, or footprint; type (for example: vehicle, pedestrian, bicycle, static object or obstacle); and/or other state information.

The vehicle on-board computing device 1120 may perform one or more prediction and/or forecasting operations. For example, the vehicle on-board computing device 1120 may predict future locations, trajectories, and/or actions of one or more objects. For example, the vehicle on-board computing device 1120 may predict the future locations, trajectories, and/or actions of the objects based at least in part on perception information (for example, the state data for each object comprising an estimated shape and pose determined as discussed below), location information, sensor data, and/or any other data that describes the past and/or current state of the objects, the AV, the surrounding environment, and/or their relationship(s). For example, if an object is a vehicle and the current driving environment includes an intersection, the vehicle on-board computing device 1120 may predict whether the object will likely move straight forward or make a turn. If the perception data indicates that the intersection has no traffic light, the vehicle on-board computing device 1120 may also predict whether the vehicle may have to fully stop prior to entering the intersection.

In various embodiments, the vehicle on-board computing device 1120 may determine a motion plan for the autonomous vehicle. For example, the vehicle on-board computing device 1120 may determine a motion plan for the autonomous vehicle based on the perception data and/or the prediction data. Specifically, given predictions about the future locations of proximate objects and other perception data, the vehicle on-board computing device 1120 can determine a motion plan for the AV that best navigates the autonomous vehicle relative to the objects at their future locations.

In some embodiments, the vehicle on-board computing device 1120 may receive predictions and make a decision regarding how to handle objects and/or actors in the environment of the AV. For example, for a particular actor (for example, a vehicle with a given speed, direction, turning angle, etc.), the vehicle on-board computing device 1120 decides whether to overtake, yield, stop, and/or pass based on, for example, traffic conditions, map data, state of the autonomous vehicle, etc. Furthermore, the vehicle on-board computing device 1120 also plans a path for the AV to travel on a given route, as well as driving parameters (for example, distance, speed, and/or turning angle). That is, for a given object, the vehicle on-board computing device 1120 decides what to do with the object and determines how to do it. For example, for a given object, the vehicle on-board computing device 1120 may decide to pass the object and may determine whether to pass on the left side or right side of the object (including motion parameters such as speed). The vehicle on-board computing device 1120 may also assess the risk of a collision between a detected object and the AV. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (for example, N milliseconds). If the collision can be avoided, then the vehicle on-board computing device 1120 may execute one or more control instructions to perform a cautious maneuver (for example, mildly slow down, accelerate, change lane, or swerve). In contrast, if the collision cannot be avoided, then the vehicle on-board computing device 1120 may execute one or more control instructions for execution of an emergency maneuver (for example, brake and/or change direction of travel).

As discussed above, planning and control data regarding the movement of the autonomous vehicle is generated for execution. The vehicle on-board computing device 1120 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 12:
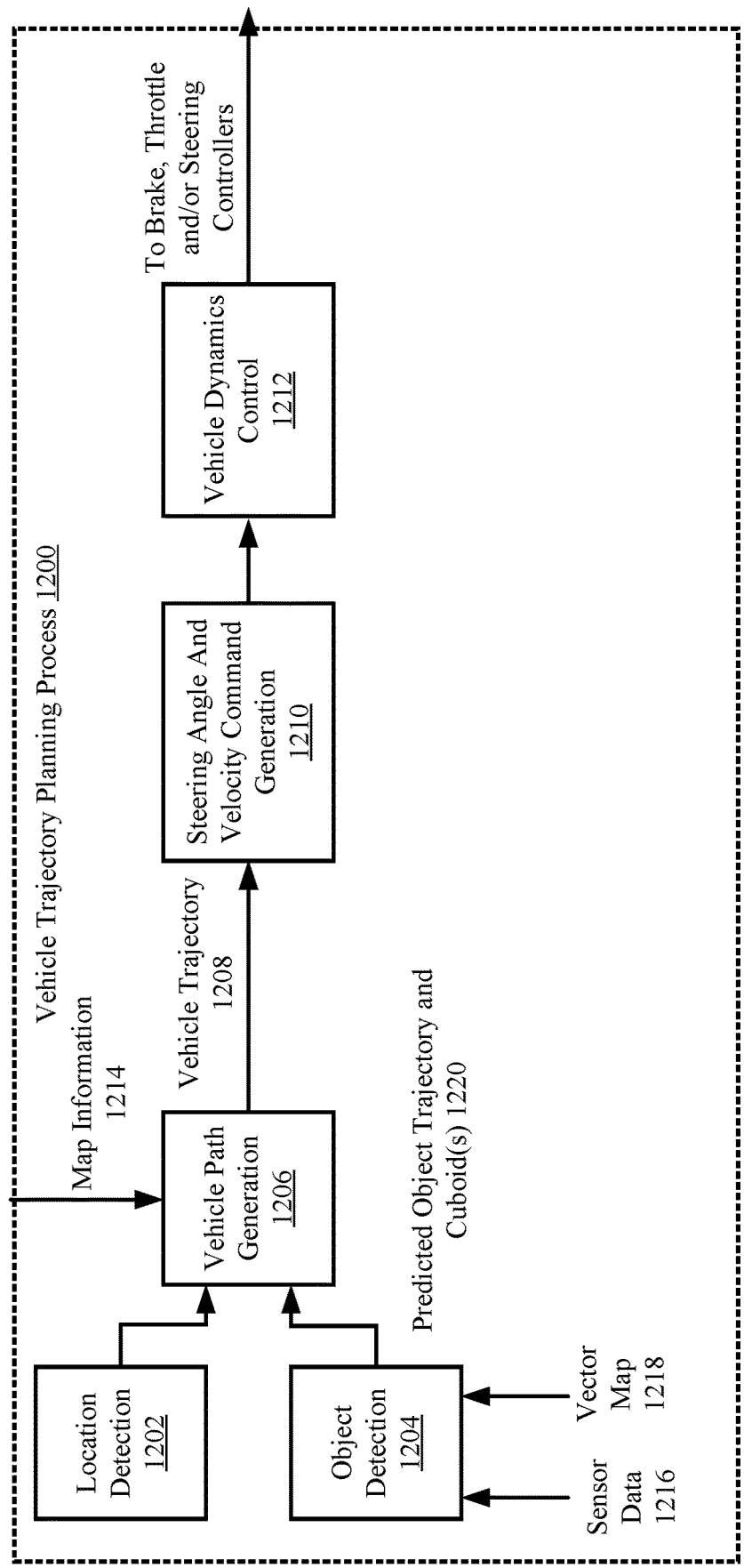
FIG. 12 provides a block diagram of an illustrative vehicle trajectory planning process.

FIG. 12 provides a block diagram that is useful for understanding how motion or movement of an AV is achieved in accordance with the present solution. All of the operations performed in blocks 1202-1212 can be performed by the on-board computing device (for example, on-board computing device 1022 of FIGS. 10 and/or 1120 of FIG. 11) of a vehicle (for example, AV 1002 of FIG. 10).

In block 1202, a location of the AV (for example, AV 1002 of FIG. 10) is detected. This detection can be made based on sensor data output from a location sensor (for example, location sensor 1160 of FIG. 11) of the AV. This sensor data can include, but is not limited to, GPS data. The detected location of the AV is then passed to block 1206.

In block 1204, an object (for example, vehicle 1003 of FIG. 10) is detected within proximity of the AV (for example, <100+ meters). This detection is made based on sensor data output from a camera (for example, camera 1162 of FIG. 11) of the AV and/or a lidar system (for example, lidar system 1164 of FIG. 11) of the AV. For example, image processing is performed to detect an instance of an object of a certain class (for example, a vehicle, cyclist or pedestrian) in an image. The image processing/object detection can be achieved in accordance with any known or to be known image processing/object detection algorithm.

Additionally, a predicted trajectory is determined in block 1204 for the object. The object's trajectory is predicted in block 1204 based on the object's class, cuboid geometry (ies), cuboid heading(s) and/or contents of a map 1218 (for example, sidewalk locations, lane locations, lane directions of travel, driving rules, etc.). The manner in which the cuboid geometry(ies) and heading(s) are determined will become evident as the discussion progresses. At this time, it should be noted that the cuboid geometry(ies) and/or heading(s) are determined using sensor data of various types (for example, 2D images, 3D lidar point clouds) and a vector map 1218 (for example, lane geometries). Techniques for predicting object trajectories based on cuboid geometries and headings may include, for example, predicting that the object is moving on a linear path in the same direction as the heading direction of a cuboid. The predicted object trajectories can include, but are not limited to, the following trajectories: a trajectory defined by the object's actual speed (for example, 1 mile per hour) and actual direction of travel (for example, west); a trajectory defined by the object's actual speed (for example, 1 mile per hour) and another possible direction of travel (for example, south, south-west, or X (for example, 40°) degrees from the object's actual direction of travel in a direction towards the AV) for the object; a trajectory defined by another possible speed for the object (for example, 2-10 miles per hour) and the object's actual direction of travel (for example, west); and/or a trajectory defined by another possible speed for the object (for example, 2-10 miles per hour) and another possible direction of travel (for example, south, south-west, or X (for example, 40°) degrees from the object's actual direction of travel in a direction towards the AV) for the object. The possible speed(s) and/or possible direction(s) of travel may be pre-defined for objects in the same class and/or sub-class as the object. It should be noted once again that the cuboid defines a full extent of the object and a heading of the object. The heading defines a direction in which the object's front is pointed, and therefore provides an indication as to the actual and/or possible direction of travel for the object.

Information 1220 specifying the object's predicted trajectory, the cuboid geometry(ies)/heading(s) is provided to block 1206. In some scenarios, a classification of the object is also passed to block 1206. In block 1206, a vehicle trajectory is generated using the information from blocks 1202 and 1204. Techniques for determining a vehicle trajectory using cuboids may include, for example, determining a trajectory for the AV that would pass the object when the object is in front of the AV, the cuboid has a heading direction that is aligned with the direction in which the AV is moving, and the cuboid has a length that is greater than a threshold value. The present solution is not limited to the particulars of this scenario. The vehicle trajectory 1208 can be determined based on the location information from block 1202, the object detection information from block 1204, and/or map information 1214 (which is pre-stored in a data store of the vehicle). The map information 1214 may include, but is not limited to, all or a portion of road map(s) 1060 of FIG. 10. The vehicle trajectory 1208 may represent a smooth path that does not have abrupt changes that would otherwise provide passenger discomfort. For example, the vehicle trajectory is defined by a path of travel along a given lane of a road in which the object is not predicted to travel within a given amount of time. The vehicle trajectory 1208 is then provided to block 1210.

In block 1210, a steering angle and velocity command is generated based on the vehicle trajectory 1208. The steering angle and velocity command are provided to block 1210 for vehicle dynamics control, i.e., the steering angle and velocity command causes the AV to follow the vehicle trajectory 1208.

Various embodiments can be implemented, for example, using one or more computer systems, such as computer system 1300 shown in FIG. 13. Computer system 1300 can be any computer capable of performing the functions described in this document.

Computer system 1300 includes one or more processors (also called central processing units, or CPUs), such as a processor 1304. Processor 1304 is connected to a communication infrastructure or bus 1302. Optionally, one or more of the processors 1304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1300 also includes user input/output device(s) 1316, such as monitors, keyboards, pointing devices, etc., that communicate with communication infrastructure 1302 through user input/output interface(s) 1308.

Computer system 1300 also includes a main or primary memory 1306, such as random access memory (RAM). Main memory 1306 may include one or more levels of cache. Main memory 1306 has stored therein control logic (i.e., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be an external hard drive, a universal serial bus (USB) drive, a memory card such as a compact flash card or secure digital memory, a floppy disk drive, a magnetic tape drive, a compact disc drive, an optical storage device, a tape backup device, and/or any other storage device/drive.

Removable storage drive 1314 may interact with a removable storage unit 1318. Removable storage unit 1318 includes a computer usable or readable storage device having stored thereon computer software (control logic) and/or data. Removable storage unit 1318 may be an external hard drive, a universal serial bus (USB) drive, a memory card such as a compact flash card or secure digital memory, a floppy disk, a magnetic tape, a compact disc, a DVD, an optical storage disk, and/any other computer data storage device. Removable storage drive 1314 reads from and/or writes to removable storage unit 1318 in a well-known manner.

According to an example embodiment, secondary memory 1310 may include other means, instrumentalities or other approaches for allowing computer programs and/or other instructions and/or data to be accessed by computer system 1300. Such means, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or network interface 1324. Communication interface 1324 enables computer system 1300 to communicate and interact with any combination of remote devices, remote networks, remote entities, etc. (individually and collectively referenced by reference number 1328). For example, communication interface 1324 may allow computer system 1300 to communicate with remote devices 1328 over communications path 1326, which may be wired and/or wireless, and which may include any combination of LANs, WANs, the Internet, etc. Control logic and/or data may be transmitted to and from computer system 1300 via communication path 1326.

In some embodiments, a tangible, non-transitory apparatus or article of manufacture comprising a tangible, non-transitory computer useable or readable medium having control logic (software) stored thereon is also referred to in this document as a computer program product or program storage device. This includes, but is not limited to, computer system 1300, main memory 1306, secondary memory 1310, and removable storage units 1318 and 1322, as well as tangible articles of manufacture embodying any combination of the foregoing. Such control logic, when executed by one or more data processing devices (such as computer system 1300), causes such data processing devices to operate as described in this document.

Based on the teachings contained in this disclosure, it will be apparent to persons skilled in the relevant art(s) how to make and use embodiments of this disclosure using data processing devices, computer systems and/or computer architectures other than that shown in FIG. 13. In particular, embodiments can operate with software, hardware, and/or operating system implementations other than those described in this document. ss Terms that are relevant to this disclosure include:

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices which may be components of a single device or components of separate devices, together or collectively perform a process.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

Embodiments have been described in this document with the aid of functional building blocks illustrating the implementation of specified functions and relationships. The boundaries of these functional building blocks have been arbitrarily defined in this document for the convenience of the description. Alternate boundaries can be defined as long as the specified functions and relationships (or their equivalents) are appropriately performed. Also, alternative embodiments can perform functional blocks, steps, operations, methods, etc. using orderings different than those described in this document.

The features from different embodiments disclosed herein may be freely combined. For example, one or more features from a method embodiment may be combined with any of the system or product embodiments. Similarly, features from a system or product embodiment may be combined with any of the method embodiments herein disclosed.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The features from different embodiments disclosed herein may be freely combined. For example, one or more features from a method embodiment may be combined with any of the system or product embodiments. Similarly, features from a system or product embodiment may be combined with any of the method embodiments herein disclosed.

The breadth and scope of this disclosure should not be limited by any of the above-described example embodiments but should be defined only in accordance with the following claims and their equivalents.

As described above, this document discloses system, method, and computer program product embodiments for operating a lidar system. The system embodiments include a processor or computing device implementing the methods for operating a lidar. The computer program embodiments include programming instructions, for example, stored in a memory, to cause a processor to perform the data management methods described in this document. The system embodiments also include a processor which is configured to perform the methods described in this document, for example, via the programming instructions. More generally, the system embodiments include a system comprising means to perform the steps of any of the methods described in this document.

What is claimed is:

1. A method for operating a sensor system, comprising:
   receiving, by a computing device, a track for an object;
   classifying, by the computing device, the track as an infant track or a mature track based on a type of sensor detection used to generate the track, a total number of cycles in which lidar detections were generated, a total number of sensor detections included in the track, an object type associated with the track, an object speed, or a distance between the object and the sensor system; and
   using, by the computing device, radar data to modify a speed of the track in response to the track being classified as an infant track.

2. The method according to claim 1, further comprising using the track with the modified speed to control autonomous operations of a vehicle.

3. The method according to claim 1, wherein the track is classified as an infant track when lidar detections were used to generate the track, the total number of cycles in which the lidar detections were generated is less than a threshold number of cycles, the object type associated with the track is a vehicle type, and the object speed is less than a threshold speed.

4. The method according to claim 1, wherein the track is classified as a mature track when radar detections were used to generate the track, the total number of cycles in which the lidar detections were generated is greater than a threshold number of cycles, the object type associated with the track is a non-vehicle type, and the object speed is greater than a threshold speed.

5. The method according to claim 1, wherein the using the radar data to modify the speed of the track comprises:
   identifying radar detections of the radar data that have an association with the infant track; and
   updating a velocity value of the infant track to a higher velocity value based on the radar detections.

6. The method according to claim 5, wherein the identifying radar detections of the radar data that have an association with the infant track comprises computing an intersect over union distance between an extent of the radar detections and an extent of the lidar detections of the infant track.

7. The method according to claim 5, wherein the identifying radar detections of the radar data that have an association with the infant track comprises computing a distance between a centroid of a radar segment and a centroid of the infant track.

8. The method according to claim 5, wherein the using the radar data to modify the speed of the track further comprises dealiasing the radar detections which were identified.

9. The method according to claim 8, wherein the dealiasing comprises:
   using a measured range-rate and a velocity ambiguity for the radar detections to generate hypothesis range-rate values for a plurality of different k values;
   identifying a hypothesis range-rate value from the hypothesis range-rate values that has (i) a range-rate orientation consistent with the orientation of a closest lane and (ii) a projected range-rate value less than or equal to a speed limit of the closest lane; and
   modifying the radar detections to include the identified hypothesis range-rate value.

10. A system, comprising:
    a processor; and
    a non-transitory computer-readable storage medium comprising programming instructions that are configured to cause the processor to implement a method for operating a sensor system, wherein the programming instructions comprise instructions to:
    receive a track for an object;
    classify the track as an infant track or a mature track based on a type of sensor detection used to generate the track, a total number of cycles in which the lidar detections were generated, a total number of sensor detections included in the track, an object type associated with the track, an object speed, or a distance between the object and the sensor system; and
    use radar data to modify a speed of the track in response to the track being classified as an infant track.

11. The system according to claim 10, wherein the programming instructions further comprise instructions to use the track with the modified speed to control autonomous operations of a vehicle.

12. The system according to claim 10, wherein the track is classified as an infant track when lidar detections were used to generate the track, the total number of cycles in which the lidar detections were generated is less than a threshold number of cycles, the object type associated with the track is a vehicle type, and the object speed is less than a threshold speed.

13. The system according to claim 10, wherein the track is classified as a mature track when radar detections were used to generate the track, the total number of cycles in which the lidar detections were generated is greater than a threshold number of cycles, the object type associated with the track is a non-vehicle type, and the object speed is greater than a threshold speed.

14. The system according to claim 10, wherein the speed of the track is modified by:
identifying radar detections of the radar data that have an association with the infant track; and
updating a velocity value of the infant track to a higher velocity value based on the radar detections.

15. The system according to claim 14, wherein the radar detections are identified based on an intersect over union distance between an extent of the radar detections and an extent of the lidar detections of the infant track.

16. The system according to claim 14, wherein the radar detections are identified based on a distance between a centroid of a radar segment and a centroid of the infant track.

17. The system according to claim 14, wherein the programming instructions further comprise instructions to dealias the radar detections which were identified.

18. The method according to claim 17, wherein the radar detections are dealiased by:
using a measured range-rate and a velocity ambiguity for the radar detections to generate hypothesis range-rate values for a plurality of different k values;
identifying a hypothesis range-rate value from the hypothesis range-rate values that has (i) a range-rate orientation consistent with the orientation of a closest lane and (ii) a projected range-rate value less than or equal to a speed limit of the closest lane; and
modifying the radar detections to include the identified hypothesis range-rate value.

19. A non-transitory computer-readable medium that stores instructions that, when executed by at least one computing device, will cause the at least one computing device to perform operations comprising:
receiving a track for an object;
classifying the track as an infant track or a mature track based on a type of sensor detection used to generate the track, a total number of cycles in which the lidar detections were generated, a total number of sensor detections included in the track, an object type associated with the track, an object speed, or a distance between the object and the sensor system; and
using radar data to modify a speed of the track in response to the track being classified as an infant track.

20. The non-transitory computer-readable medium according to claim 19, wherein the at least one computing device is further caused to use the track with the modified speed to control autonomous operations of a vehicle.

* * * * *